United States Patent
Greenwood et al.

(10) Patent No.: US 7,955,210 B2
(45) Date of Patent: Jun. 7, 2011

(54) DRIVE MECHANISM FOR INFINITELY VARIABLE TRANSMISSION

(75) Inventors: Christopher John Greenwood, Preston (GB); Andrew Damian De Freitas, Wigan (GB); Robert Andrew Oliver, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 765 days.

(21) Appl. No.: 11/816,023

(22) PCT Filed: Feb. 10, 2006

(86) PCT No.: PCT/EP2006/050860
§ 371 (c)(1),
(2), (4) Date: Jan. 22, 2008

(87) PCT Pub. No.: WO2006/084905
PCT Pub. Date: Aug. 17, 2006

(65) Prior Publication Data
US 2008/0269001 A1    Oct. 30, 2008

(30) Foreign Application Priority Data
Feb. 11, 2005 (GB) .................................. 0502929.3

(51) Int. Cl.
*F16H 37/02* (2006.01)
*F16H 15/36* (2006.01)
(52) U.S. Cl. ........................ 475/216; 475/217; 476/39
(58) Field of Classification Search .................. 475/214, 475/215, 216, 217; 476/39, 40, 42, 45
See application file for complete search history.

(56) References Cited

U.S. PATENT DOCUMENTS

| | | | | |
|---|---|---|---|---|
| 2,086,491 A | * | 7/1937 | Dodge | 475/216 |
| 2,164,504 A | * | 7/1939 | Dodge | 475/216 |
| 2,580,669 A | | 1/1952 | Garnier | |
| 3,267,756 A | * | 8/1966 | De Brie et al. | 476/40 |
| 3,306,119 A | * | 2/1967 | Plint et al. | 476/10 |
| 3,412,622 A | | 11/1968 | Rhodes | |

(Continued)

FOREIGN PATENT DOCUMENTS

DE          939478 C     2/1956

(Continued)

OTHER PUBLICATIONS

International Search Report; International Application No. PCT/EP2006/050860, filing date: Oct. 2, 2006.

(Continued)

*Primary Examiner* — Roger Pang
(74) *Attorney, Agent, or Firm* — Brooks Kushman P.C.

(57) ABSTRACT

A variator transmission comprises an input shaft (18), an input disc (10) mounted on the input shaft for rotation therewith and an output disc (12) facing the input disc and arranged to rotate coaxially therewith, the input and output discs defining between them a toroidal cavity. Two rollers (14, 16) are located in the toroidal cavity and first and second roller carriage means are provided upon which the first and second rollers respectively are rotatably mounted and end load means (34, 36) urge the rollers into contact with the input and output discs to transmit drive. The two roller carriage means are mounted on opposite sides of the pivotal axis of a lever (50) and the pivotal axis of the lever (50) is movable in the radial direction with respect to the rotational axis of the input and output discs.

16 Claims, 2 Drawing Sheets

U.S. PATENT DOCUMENTS

| | | | |
|---|---|---|---|
| 4,434,676 A | 3/1984 | Horton | |
| 5,111,710 A | 5/1992 | Perry | |
| 6,099,431 A * | 8/2000 | Hoge et al. | 475/216 |
| 6,251,039 B1 * | 6/2001 | Koga | 475/216 |
| 6,358,178 B1 * | 3/2002 | Wittkopp | 475/207 |
| 6,575,869 B2 * | 6/2003 | Ervin | 476/40 |

FOREIGN PATENT DOCUMENTS

| | | |
|---|---|---|
| GB | 140377 A | 12/1920 |
| GB | 304372 A | 1/1929 |
| GB | 344063 | 3/1931 |
| GB | 415076 A | 8/1934 |
| GB | 1026734 | 4/1966 |
| GB | 1133265 | 11/1968 |

OTHER PUBLICATIONS

Written Opinion of the International Searching Authority; International Application No. PCT/EP2006/050860; filing date: Oct. 2, 2006.

* cited by examiner

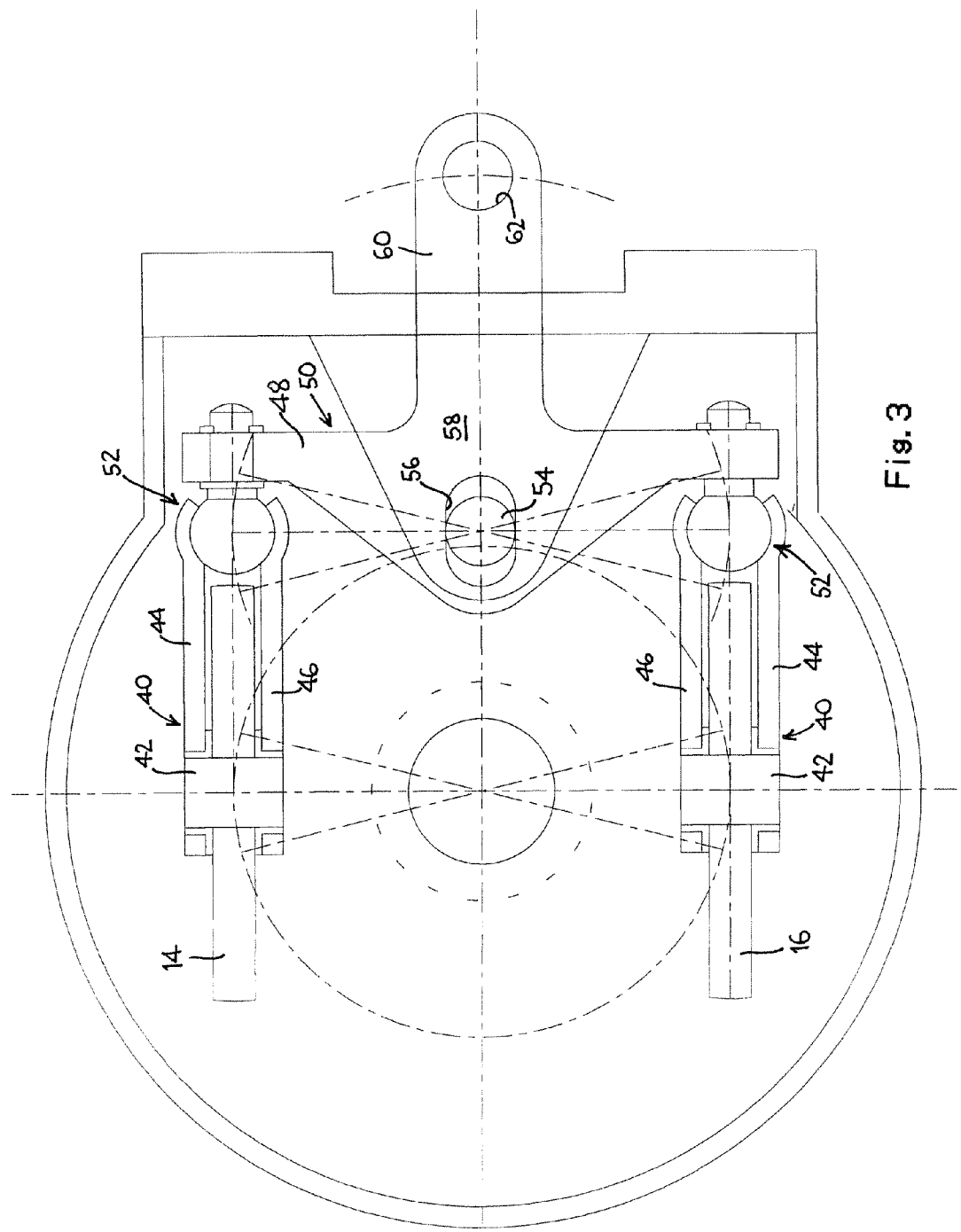

DRIVE MECHANISM FOR INFINITELY VARIABLE TRANSMISSION

BACKGROUND OF THE INVENTION

1. Field of the Invention

The present invention relates to infinitely variable ratio transmission apparatus of the toroidal race rolling traction type, hereinafter referred to as a variator.

2. Background Art

The basic form of variator comprises a toroidally-recessed input disc connected to an input drive shaft and a toroidally-recessed output disc arranged coaxially with respect to the input disc. A plurality of rollers (usually three rollers) is provided in the toroidal cavity defined between the input and output discs and power is transmitted from the input disc to the output disc by means of the rollers. The rollers are mounted in roller carriages which are subjected to transverse forces (usually by means of double-acting hydraulic pistons). The same hydraulic pressure is normally applied to a so-called end load chamber to apply an axial force to one of the discs in order to ensure that the rollers are frictionally engaged with the input and output discs.

Such transmissions are mainly designed for use in relatively high power, high torque applications such as in motor vehicle transmissions. Indeed, in order to be able to handle the levels of power and torque and to provide a more balanced transmission, it is normally necessary to utilise a pair of input discs and a pair of coaxially mounted output discs, defining two toroidal cavities, each of which encloses three rollers. One advantage of using three rollers in each toroidal cavity is that the arrangement is inherently stable in that roller contact at three equally-spaced locations around the discs minimises bending of the variator components and therefore minimises wear. However, it is also normally necessary for each roller to be provided with its own double-acting control piston and for the hydraulic pressures to be controlled by computer.

SUMMARY OF THE INVENTION

Whilst the cost of such sophistication is acceptable in motor vehicle transmissions, it discourages the use of variators in less demanding environments.

There is therefore a need to provide simplified, low-cost variator for use in circumstances which are not so demanding.

In accordance with the present invention, there is provided a variator transmission comprising:

an input shaft;

an input disc mounted on the input shaft for rotation therewith;

an output disc facing the input disc and arranged to rotate coaxially to therewith, the input and output discs defining between them a toroidal cavity;

two rollers located in the toroidal cavity;

first and second roller carriage means upon which the first and second rollers are respectively rotatably mounted;

end load means to urge the rollers into contact with the input and output discs to transmit drive;

lever means having a pivotal axis, the two roller carriage means being mounted on the lever means on opposite sides of the pivotal axis; and pivoting means for pivoting the lever means about the pivotal axis;

wherein the pivotal axis of the lever is movable in the radial direction with respect to the rotational axis of the input and output discs.

By providing a variator transmission having only two rollers, and by controlling the rollers with lever means instead of hydraulically, it is possible to reduce the complexity and cost of the transmission and yet still provide a transmission which is suitable for relatively low-power, low-torque applications. However, the radial movement of the pivotal axis of the lever means allows the lever means to move to a position where the forces on the rollers are equalised.

Preferably, the pivotal axis of the lever is fixed in the direction perpendicular to the said radial direction, i.e. the movement of the pivotal axis is restricted to the said radial direction.

The lever means preferably comprises a pivot pin which is displaceable along a slot which extends in the said radial direction. The diameter of the pivot pin is preferably substantially the same as the width of the slot, whereby the pivot pin is constrained to move in the longitudinal direction of the slot. Preferably, the pivotal axis is movable through a predetermined distance in the said radial direction.

Preferably, the pivoting means for pivoting the lever means comprises an arm portion.

Preferably, pivot means (e.g. a spherical joint) are provided between each roller carriage means and the lever means.

Preferably, the input shaft and the output disc drive the inputs of a mixing epicyclic gear train, which is preferably arranged coaxially with respect to the input shaft.

There may also be reduction gear means connected to the output of the mixing epicyclic gear train.

Preferably, the end load means comprises resiliently deformable means.

Preferably, the end load means comprises only resiliently deformable means.

The resiliently deformable means preferably extend between a transmission casing and one of the input and output discs The resiliently deformable means preferably comprises a spring, e.g a Belleville spring washer.

BRIEF DESCRIPTION OF THE DRAWINGS

By way of example only, a specific embodiment of the present invention will now be described with reference to the accompanying drawings, in which:

FIG. 3 is a cross-sectional front view of the transmission of FIG. 1 looking in the direction of arrows III-III, showing the roller control means.

DETAILED DESCRIPTION OF THE PREFERRED EMBODIMENTS

A continuously variable ratio transmission system comprises a variator V having a toroidally-recessed input disc 10 and a facing toroidally-recessed output disc 12. Two rollers 14, 16 are mounted in the toroidal cavity defined between the opposing toroidally-recessed faces of the input and output discs 10, 12 to transmit drive from the input disc 10 to the output disc 12 with a ratio which is variable by tilting the rollers 14, 16.

Figure 1:
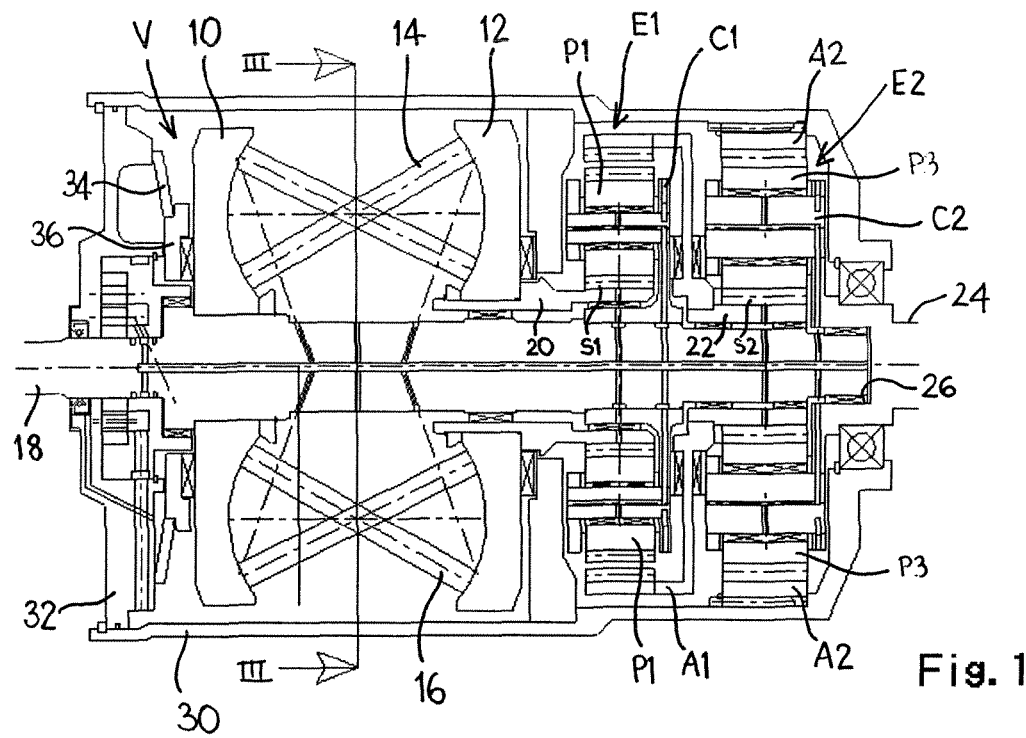
FIG. 1 is a longitudinal cross-section through an embodiment of variator transmission in accordance with the present invention.
Figure 2:
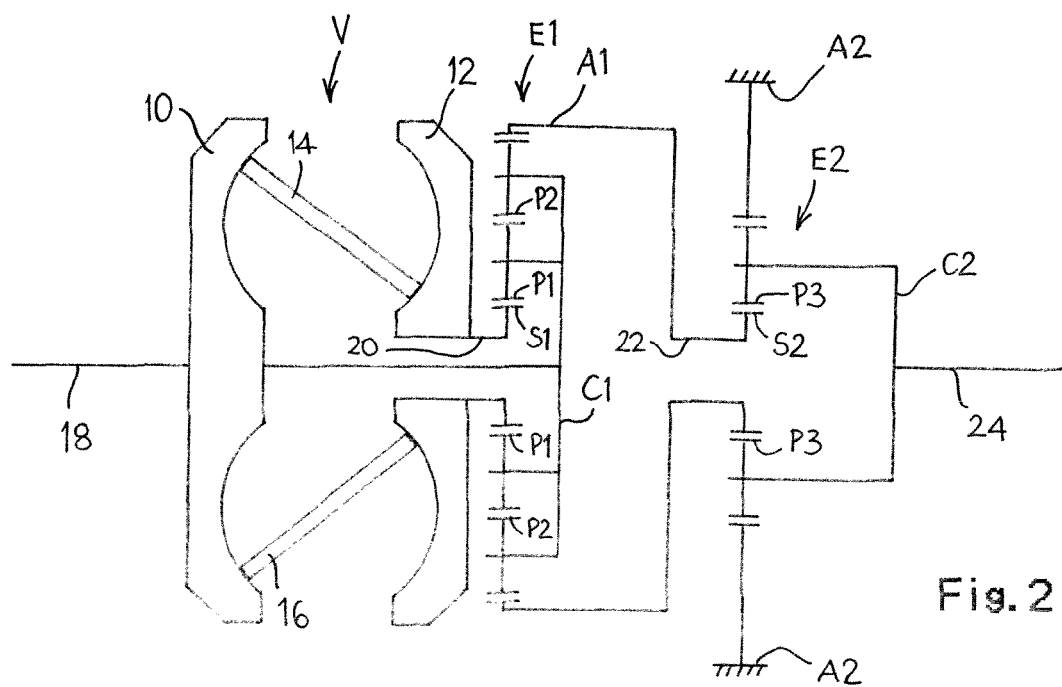
FIG. 2 is a schematic representation of the transmission of FIG. 1.

The input disc 10 is connected to, and rotates with, a system input shaft 18. The variator V provides an output via a tubular output shaft 20 which is connected to the output disc 12 and arranged coaxially with, and around, the input shaft 18. The input shaft 18 and the variator output shaft 20 provide the inputs to a compound mixing epicyclic gear train E1. As shown schematically, the end of the variator output shaft 20 remote from the output disc 12 carries a first sun gear S1 of the mixing epicyclic gear train E1. The carrier C1 of the gear train E1 is connected to, and driven by, the input shaft 18. The carrier C1 carries four identical equally-spaced radially inner planet gears P1 and four identical equally-spaced radially outer planet gears P2 (not visible in FIG. 1) of the same size as the radially inner planet gears P1. The radially inner planet gears P1 engage with the first sun gear S1 and with a respective one of the four radially outer planet gears P2. The radially outer planet gears P2 also engage with an internally-toothed annulus A1, which forms the output of the mixing epicyclic gear train E1. The output from the annulus A1 is connected via tubular coaxial output shaft 22 to a simple reducing epicyclic gearset E2. The reducing epicyclic gearset E2 comprises an input sun gear S2 carried by shaft 22 which meshes with four equally angularly spaced planet gears P3 carried by carrier C2. The planet gears P3 also mesh with an annulus A2 fixed to the transmission housing. The rotation of the carrier C2 forms the output of the reducing epicyclic gear set E2 and is transmitted to the exterior by an output shaft 24 which is connected to the carrier C2. The output shaft 24 is coaxial with the input shaft 18, one end of which is received in a recess 26 in the innermost end of the output shaft 24.

The transmission is housed in a generally tubular casing 30 which supports the input and output shafts 18, 20. The end of the casing 30 adjacent the input shaft 18 is closed off by means of an end plate 32. A conical Belleville spring washer 34 extends between the inner face of the end plate 32 and an annular bearing plate 36 which is in rolling contact with an outer planar face of the variator input disc 10. The Belleville spring washer applies a force (an "end load") to the input disc 10 and permits torque to be transmitted form the input disc 10 via the rollers 14, 16 to the output disc 12.

By varying the inclination of the two rollers 14, 16 (as will be discussed below), the speed of the output disc 12 relative to the input disc 10 can be varied. By combining the rotations of the transmission input and variator output in the mixing epicyclic gear train E1, the output of the transmission can be varied. In the arrangement illustrated, the transmission can be varied between full reverse, through "geared neutral" to full forward. However, by appropriate selection of the gearing the operating range of the variator can be tailored to requirements. For example, the variator may be arranged to vary between low reverse through geared neutral and through to high forward overdrive if a vehicle to which the transmission were fixed normally operated in forward gear and only operated occasionally in reverse.

The mechanism for varying the inclination of the two rollers 14, 16 is shown in more detail in FIG. 3. Each roller 14, 16 is rotatably mounted in a roller carriage 40 by means of a stub axle 42 which is rotatably mounted in opposed planar support plates 44, 46 of the roller carriage. One end of each of the roller carriages 40 is connected to a respective one of the two ends of the cross-bar 48 of a control lever 50 by means of a spherical bearing 52 (e.g. a "Rose bearing" manufactured by Rose Bearings Limited). The control lever 48 is provided with a pivot pint 54 located mid-way between the centre points of the two spherical bearings 52. The pivot pin is received in a slot 56 of the same width as the diameter of the pivot pin but elongated in the radial direction with respect to the rotational axis of the variator. The slot 56 is provided in a mounting lug 58 which projects into the variator into the space between the input and output discs 10, 12.

The lever 50 is provided with an actuating arm 60 which projects out of the variator housing in a direction perpendicular to the line jointing the center points of the two spherical bearings 52 (i.e. perpendicular to the axis of the cross-bar 48 of the lever). The end of the arm 60 which projects out of the variator housing is provided with a hole 62 for connection of two Bowden cables (not shown) or other direct mechanical linkage for pivoting the lever in opposite directions. The connection will be a direct mechanical connection from the person operating the equipment of which the transmission is to form part and it is important that any force on the lever 50 should be applied in a direction perpendicular to the longitudinal axis of the arm 60 so as not to apply any force along the longitudinal axis of the arm 60. For example, the arm 60 may be connected to a vehicle accelerator pedal or to forward and reverse pedals.

As the lever 50 pivots, one of the rollers 14, 16 is pushed and the other is pulled, both with equal torque. The mounting of the pivot pin 54 within the slot 56 in the mounting lug 58 allows the pin 54 to move radically inwardly and outwardly, which ensures that the horizontal forces from the rollers are equalized and cancel each other out. This is important in low-cost assemblies, where the manufacture of the components is likely to be less accurate. The radial movement of the pivot of the lever allows the lever to move to a position in which any imbalance between the two rollers which arises from manufacturing differences will be cancelled out.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A variator transmission comprising:
   an input shaft;
   an input disc mounted on the input shaft for rotation therewith;
   an output disc facing the input disc and arranged to rotate coaxially therewith, the input and output discs defining between them a toroidal cavity;
   a total of two rollers located in the toroidal cavity;
   first and second roller carriage means upon which the first and second rollers respectively are rotatably mounted;
   end load means to urge the rollers into contact with the input and output discs to transmit drive;
   lever means having a pivotal axis, the two roller carriage means being mounted on the lever means on opposite sides of the pivotal axis; and
   pivoting means for pivoting the lever means about the pivotal axis;
   wherein the pivotal axis of the lever means is movable in a radial direction perpendicular to the rotational axis of the rollers.

2. A variator transmission as claimed in claim 1, wherein the pivotal axis of the lever means is fixed in the direction perpendicular to the said radial direction.

3. A variator transmission as claimed in claim 1, wherein the lever means comprises a pivot pin which is displaceable along a slot which extends in the said radial direction.

4. A variator transmission as claimed in claim 3, wherein the diameter of the pivot pin is substantially the same as the width of the slot.

5. A variator transmission as claimed in claim 1, wherein the pivotal axis of the lever means is movable through a predetermined distance in the said radial direction.

6. A variator transmission as claimed in claim 1, wherein the pivoting means for pivoting the lever means about the pivotal axis comprises an arm portion.

7. A variator transmission in claim 1, further comprising pivot means between each roller carriage means and the lever means.

8. A variator transmission as claimed in claim 7, wherein the pivot means comprises a spherical joint.

9. A variator transmission as claimed in claim 1, wherein the input shaft and the output disc form the inputs of a mixing epicyclic gear train.

10. A variator transmission as claimed in claim 9, wherein the mixing epicyclic gear train is arranged coaxially with respect to the input shaft.

11. A variator transmission as claimed in claim 9, further comprising reduction gear means connected to the output of the mixing epicyclic gear train.

12. A variator transmission as claimed in claim 1, wherein the end load means comprises resiliently deformable means.

13. A variator transmission as claimed in claim 12, wherein the end load means comprises only resiliently deformable means.

14. A variator transmission as claimed in claim 12, wherein the resiliently deformable means extends between a transmission housing and one of the input and output discs.

15. A variator transmission as claimed in claim 12, wherein the resiliently deformable means comprises a spring.

16. A variator transmission comprising:
an input shaft;
an input disc mounted on the input shaft for rotation therewith;
an output disc facing the input disc and arranged to rotate coaxially therewith, the input and output discs defining between them a toroidal cavity;
a total of two rollers located in the toroidal cavity;
first and second roller carriage means upon which the first and second rollers respectively are rotatably mounted;
end load means to urge the rollers into contact with the input and output discs to transmit drive;
lever means having a pivotal axis, the two roller carriage means being mounted on the lever means on opposite sides of the pivotal axis; and
pivoting means for pivoting the lever means about the pivotal axis;
wherein the pivotal axis of the lever means is movable in a single, predetermined radial direction parallel to the rotational axis of the input and output discs.

* * * * *